(12) United States Patent
Wu

(10) Patent No.: US 9,927,648 B2
(45) Date of Patent: Mar. 27, 2018

(54) MANUFACTURING METHODS OF DISPLAY PANEL AND DISPLAY DEVICE

(71) Applicant: BOE TECHNOLOGY GROUP CO., LTD., Beijing (CN)

(72) Inventor: Yanbing Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 204 days.

(21) Appl. No.: 14/803,293

(22) Filed: Jul. 20, 2015

(65) Prior Publication Data

US 2016/0124262 A1    May 5, 2016

(30) Foreign Application Priority Data

Oct. 30, 2014   (CN) .......................... 201410599115.7

(51) Int. Cl.
*G02F 1/1335*    (2006.01)

(52) U.S. Cl.
CPC .. *G02F 1/133502* (2013.01); *G02F 1/133512* (2013.01)

(58) Field of Classification Search
CPC ..... G03F 7/0007; G03F 7/0002; B33Y 70/00; C07D 209/86; G02B 5/201; G02B 5/223;
(Continued)

(56) References Cited

U.S. PATENT DOCUMENTS 6,466,279 B1 * 10/2002 Nakata .............. G02F 1/136227
349/122

7,718,329 B2 * 5/2010 Choi ................. G02F 1/133502
257/E21.535
(Continued)

FOREIGN PATENT DOCUMENTS

CN           1892265        1/2007
CN         101285956       10/2008
(Continued)

OTHER PUBLICATIONS

Office Action from China Application No. 201410599115.7 dated Feb. 4, 2017.
(Continued)

*Primary Examiner* — Huyen Ngo
(74) *Attorney, Agent, or Firm* — Calfee, Halter & Griswold LLP

(57) ABSTRACT

The embodiments of the present invention provide a display panel, a method for manufacturing the display panel, a display device, and a method for manufacturing the display device, relating to the technical field of display, thereby solving the problem that the anti-reflection effect of AR film is poor, since attaching an AR film can only achieve a zero reflection within a narrow wavelength range. The method for manufacturing a display panel comprises forming a black matrix on a first surface of a base substrate, and defining a plurality of display units with the criss-cross black matrix; forming a photoresist on a second surface of the base substrate; performing a curing process for the photoresist corresponding to the position of the display units; removing the photoresist corresponding to the position of the black matrix; and performing a texturing process for a portion of the second surface of the base substrate corresponding to the position of the black matrix.

13 Claims, 9 Drawing Sheets

(58) Field of Classification Search
CPC . B82Y 10/00; H01L 27/1288; H01L 2924/00; H05K 2201/0108; G02F 1/136209; G02F 1/133512; G02F 1/133788
See application file for complete search history.

(56) References Cited

U.S. PATENT DOCUMENTS

| | | | | |
|---|---|---|---|---|
| 2015/0226891 | A1* | 8/2015 | Song | G03F 1/58 359/361 |
| 2015/0277226 | A1* | 10/2015 | Liu | G03F 1/38 216/23 |
| 2017/0102582 | A1* | 4/2017 | Li | G02F 1/133516 |

FOREIGN PATENT DOCUMENTS

| | | |
|---|---|---|
| CN | 101515081 | 8/2009 |
| CN | 103399367 | 11/2013 |
| JP | H10288705 | 10/1998 |
| JP | 2008267633 | 11/2008 |

OTHER PUBLICATIONS

Office action from Chinese Application No. 201410599115.7 dated Aug. 8, 2016.

* cited by examiner

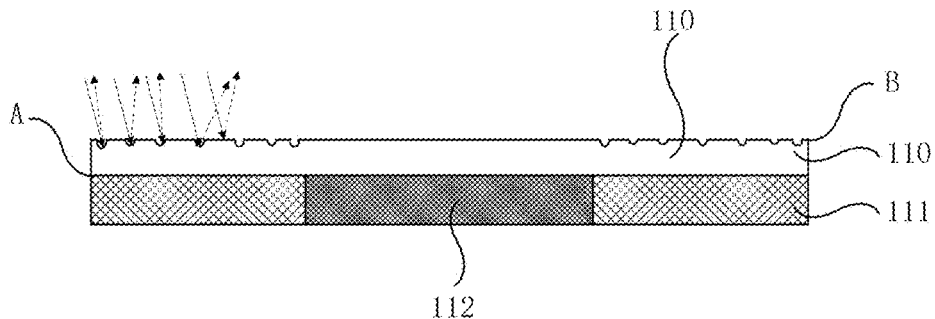

Fig. 3d

| | |
|---|---|
| providing a mask plate on the surface of the photoresist, a transparent area of the mask plate being corresponding to the position of the display units, and an opaque area of the mask plate being corresponding to the position of the black matrix | —S201 |
| exposing the photoresist such that the photoresist corresponding to the transparent area of the mask plate is cured, therefore the portion of the surface of the base substrate corresponding to the display area is protected from being roughened by the texturing process | —S202 |
| if the base substrate is a glass substrate, dry air can be filled into the hydrofluoric acid solution to form an etching solution with bubbles; spraying the etching solution on the second surface of the base substrate with a high pressure gas, forming a coarse surface | —S203 |
| peeling off the photoresist corresponding to the position of the display units | —S204 |

Fig. 4

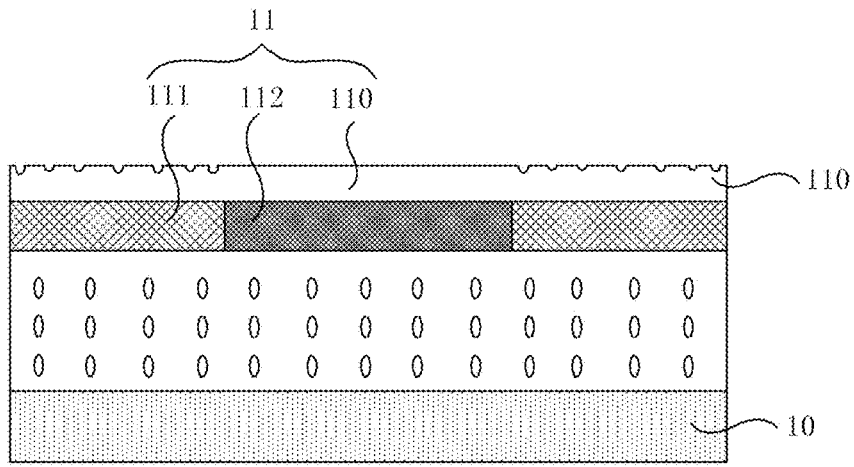

Fig. 8d

| providing a mask plate on the surface of the photoresist, a transparent area of the mask plate being corresponding to the position of the display units, and an opaque area of the mask plate being corresponding to the position of the black matrix | ←S401 |

↓

| exposing the photoresist such that the photoresist corresponding to the transparent area of the mask plate is cured, therefore the portion of the surface of the base substrate corresponding to the display area is protected from being roughened by the texturing process | ←S402 |

↓

| if the base substrate is a glass substrate, dry air can be filled into the hydrofluoric acid solution to form an etching solution with bubbles; spraying the etching solution on a surface of the base substrate departing from the array substrate with a high pressure gas, forming a coarse surface | ←S403 |

↓

| peeling off the photoresist corresponding to the position of the display units | ←S404 |

Fig. 9

MANUFACTURING METHODS OF DISPLAY PANEL AND DISPLAY DEVICE

RELATED APPLICATIONS

The present application claims the benefit of Chinese Patent Application No. 201410599115.7, filed Oct. 30, 2014, the entire disclosure of which is incorporated herein by reference.

FIELD OF THE INVENTION

The present invention relates to the technical field of display, in particular to a display panel, a method for manufacturing the display panel, a display device, and a method for manufacturing the display device.

BACKGROUND OF THE INVENTION

TFT-LCD (Thin Film Transistor Liquid Crystal Display) is a flat panel display, and is applied in high performance display fields increasingly because of its characteristics such as small volume, low power consumption, no radiation and the relatively low production cost.

As shown in FIG. 1A, a TFT-LCD consists of an array substrate 10 and a color film substrate 10'. A liquid crystal layer 12 is arranged between the array substrate 10 and the color film substrate 10'. In addition, the upper surface of the color film substrate 10' is provided with a polarizer 13. The intensity of the light can be controlled by controlling the orientation of the liquid crystal molecules in the liquid crystal layer 12, with the filter function of the color film substrate 10', color image display can be realized.

In order to eliminate the influence of the external light source on the display effect, in the existing manufacturing process of TFT-LCD, generally an AR (Anti-Reflective) film 14 is attached on a surface of the polarizer 13. The refractive index of the material of the AR film 14 is different with that of the material of the polarizer 13. In such a manner, for light incident to the AR film from a same point, a coherent addition will be performed for two reflected light beams, one of these reflected light beams being reflected at the interface between air and the AR film 14, the other being reflected at the interface between the AR film 14 and the surface of the polarizer 13, resulting in a destructive interference, thereby reducing the reflection.

However, the thickness of the AR film is related to the wavelength of the light that can be eliminated by the AR film. For example, when the thickness of the AR film is close to a quarter of the red light wavelength in the AR film, the AR film can then eliminate the reflected light of the incident light with a wavelength near red light wavelength. Therefore, the AR film can only achieve a zero reflection within a narrow wavelength range, and can not eliminate all the reflected light with wavelength of the visible light. Hence it reduces the effect of anti reflection. If, in addition, in order to improve the anti reflection effect, a plurality of AR films with different thicknesses are arranged on the polarizer 13, although they can effectively reduce the influence of visible light reflection on the display effect, meanwhile they will increase the thickness of the display, which is adverse to the ultrathin design of the display.

SUMMARY OF THE INVENTION

The embodiments of the present invention provide a display panel, a method for manufacturing the display panel, a display device, and a method for manufacturing the display device, thereby solving the problem that attaching an AR film can only achieve a zero reflection within a narrow wavelength range.

To this end, an embodiment of the present invention provides the following solutions.

An aspect of the present invention provides a method for manufacturing a display panel, wherein the method comprises forming a black matrix on a first surface of a base substrate, and defining a plurality of display units with the criss-cross black matrix, wherein the method further comprises:

forming a photoresist on a second surface of the base substrate; wherein the first surface is arranged opposite to the second surface;

performing a curing process for the photoresist corresponding to the position of the display units;

removing the photoresist corresponding to the position of the black matrix; and performing a texturing process for a portion of the second surface of the base substrate corresponding to the position of the black matrix.

Optionally, performing a curing process for the photoresist corresponding to the position of the display units comprises:

providing a mask plate on the surface of the photoresist, a transparent area of the mask plate being corresponding to the position of the display units, and an opaque area of the mask plate being corresponding to the position of the black matrix;

exposing the photoresist such that the photoresist corresponding to the transparent area of the mask plate is cured.

Optionally, performing a curing process for the photoresist corresponding to the position of the display units comprises:

employing the black matrix as a mask plate; exposing the photoresist from a side of the first surface of the base substrate, such that the photoresist corresponding to the position of the display units is cured.

Optionally, performing a texturing process for a portion of the second surface of the base substrate corresponding to the position of the black matrix comprises:

after removing the photoresist corresponding to the position of the black matrix, spraying an etching solution on the second surface of the base substrate, and etching the area of the second surface that is not covered by the photoresist.

Optionally, the etching solution is added with bubbles.

Optionally, the etching solution comprises hydrofluoric acid solution if the base substrate is a glass substrate.

Optionally, after the step of performing a texturing process for a portion of the second surface of the base substrate corresponding to the position of the black matrix, further comprises:

peeling off the photoresist corresponding to the position of the display units.

Another aspect of the present invention provides a display substrate, wherein the display substrate comprises a base substrate, a black matrix on a first surface of the base substrate, and a plurality of display units defined with the criss-cross black matrix; wherein a portion of a second surface of the base substrate corresponding to the position of the black matrix is coarse; wherein the first surface is arranged opposite to the second surface.

Another aspect of the present invention provides a display device, wherein the display device comprises the display substrate mentioned above.

Still another aspect of the present invention provides a method for manufacturing a display device, the method comprises forming a display panel; the display panel comprises a base substrate, a black matrix on a first surface of the base substrate, and a plurality of display units defined with the criss-cross black matrix, wherein the method further comprises:

forming a photoresist on a second surface of the base substrate; wherein the first surface is arranged opposite to the second surface;

performing a curing process for the photoresist corresponding to the position of the display units;

removing the photoresist corresponding to the position of the black matrix; and performing a texturing process for a portion of the second surface of the base substrate corresponding to the position of the black matrix.

Optionally, performing a curing process for the photoresist corresponding to the position of the display units comprises:

providing a mask plate on the surface of the photoresist, a transparent area of the mask plate being corresponding to the position of the display units, and an opaque area of the mask plate being corresponding to the position of the black matrix;

exposing the photoresist such that the photoresist corresponding to the transparent area of the mask plate is cured.

Optionally, performing a curing process for the photoresist corresponding to the position of the display units comprises:

employing the black matrix as a mask plate; exposing the photoresist from a side of the first surface of the base substrate, such that the photoresist corresponding to the position of the display units is cured.

Optionally, performing a texturing process for a portion of the second surface of the base substrate corresponding to the position of the black matrix comprises:

after removing the photoresist corresponding to the position of the black matrix, spraying an etching solution on the second surface of the base substrate, and etching the area of the second surface that is not covered by the photoresist.

Optionally, after the step of performing a texturing process for a portion of the second surface of the base substrate corresponding to the position of the black matrix, further comprises:

peeling off the photoresist corresponding to the position of the display units.

The embodiments of the present invention provide a display panel, a method for manufacturing the display panel, a display device, and a method for manufacturing the display device. The method for manufacturing a display panel comprises: firstly, forming a black matrix on a first surface of a base substrate, and defining a plurality of display units with the criss-cross black matrix; then forming a photoresist on a second surface of the base substrate, wherein the first surface is arranged opposite to the second surface; since the display area of the display panel corresponds to the position of the display units, then performing a curing process for the photoresist corresponding to the position of the display units, such that the portion of the base substrate corresponding to the position of the display units can be protected; then removing the photoresist corresponding to the position of the black matrix, such that the portion of the second surface of the base substrate corresponding to the position of the black matrix is not covered by the photoresist; then, performing a texturing process for a portion of the second surface of the base substrate corresponding to the position of the black matrix, such that this portion is coarse. In such a manner, when visible light is incident to the non display area of the display panel corresponding to the black matrix, diffuse reflection will occur for all visible light incident to the non display area due to the coarse surface, which can eliminate the reflected light in the non display area. Although etching process is not performed for the portion of the base substrate corresponding to the position of the display area, the reflected light in the display area has little influence on the display effect, since the intensity of the light emitted from the display area (for display) is far greater than the intensity of the reflected light. Therefore, on the premise of ensuring the normal display of the display panel, the embodiment provided by the present invention eliminates the reflected light of all the visible light incident to the non display area, without increasing the thickness of the display panel, thereby improving the image quality and product quality.

BRIEF DESCRIPTION OF THE DRAWINGS

In the following, the technical solutions in embodiments of the invention will be described clearly and completely in connection with the drawings in the embodiments of the invention. Obviously, the described embodiments are only part of the embodiments of the invention, and not all of the embodiments. Based on the embodiments in the invention, all other embodiments obtained by those of ordinary skills in the art under the premise of not paying out creative work pertain to the protection scope of the invention.

FIG. 3A-FIG. 3D are schematic diagrams of every stages in a method of manufacturing a display panel provided by an embodiment of the present invention;

FIG. 4 is a flow chart of another method for manufacturing a display panel provided by an embodiment of the present invention;

FIG. 8A-FIG. 8D are schematic diagrams of every stages in a method of manufacturing a display device provided by an embodiment of the present invention;

FIG. 9 is a flow chart of another method for manufacturing a display device provided by an embodiment of the present invention;

REFERENCE SIGNS

10—array substrate; 10'—color film substrate; 11—display substrate; 100—sub-pixel; 101—pixel electrode; 110—base substrate; A—first surface of the base substrate; B—second surface of the base substrate; 111—black matrix; 112—display unit; 12—liquid crystal layer; 13—polarizer; 14—AR film; 20—photoresist; 21—mask plate; C—transparent area of the mask plate; D—opaque area of the mask plate; 22—etching solution.

DETAILED DESCRIPTION OF THE INVENTION

The embodiments of the present invention provide a direct type backlight module and a display device to reduce the light mixing distance on the premise of obtaining a homogeneous illumination, thereby reducing the thickness of the direct type backlight module and the thickness of the entire display device.

Figure 2:
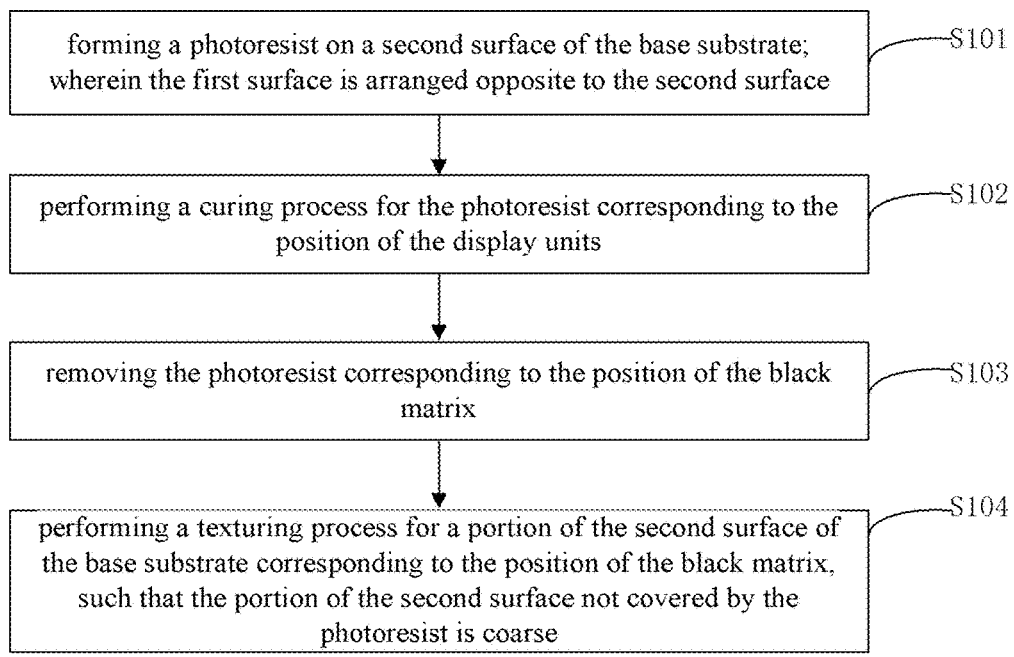
FIG. 2 is a flow chart of a method for manufacturing a display panel provided by an embodiment of the present invention.
Figure 3A:
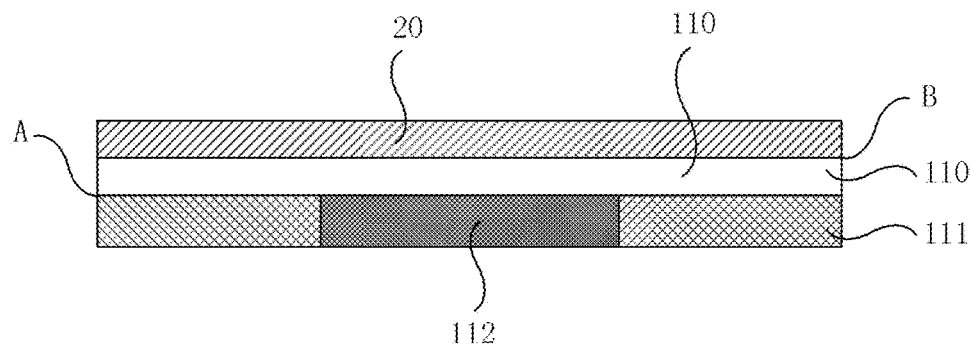

An embodiment of the present invention provides a method for manufacturing a display panel, wherein the method comprises forming a black matrix 111 on a first surface A of a base substrate 110, and defining a plurality of display units 112 with the criss-cross black matrix 111, as shown in FIG. 2, wherein the method can further comprise:

S101, as shown in FIG. 3A, forming a photoresist 20 on a second surface B of the base substrate 110; wherein the first surface A is arranged opposite to the second surface B.

Figure 3B:
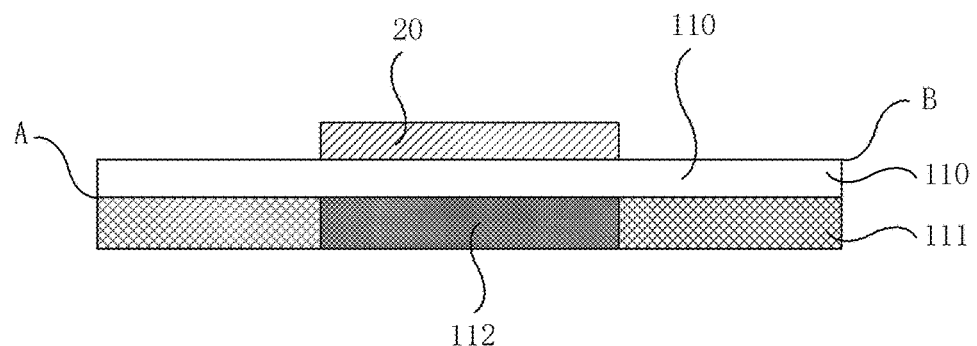

S102, as shown in FIG. 3B, performing a curing process for the photoresist 20 corresponding to the position of the display units 112, such that the photoresist 20 at this position is cured.

S103, removing the photoresist 20 corresponding to the position of the black matrix 111.

Figure 3C:
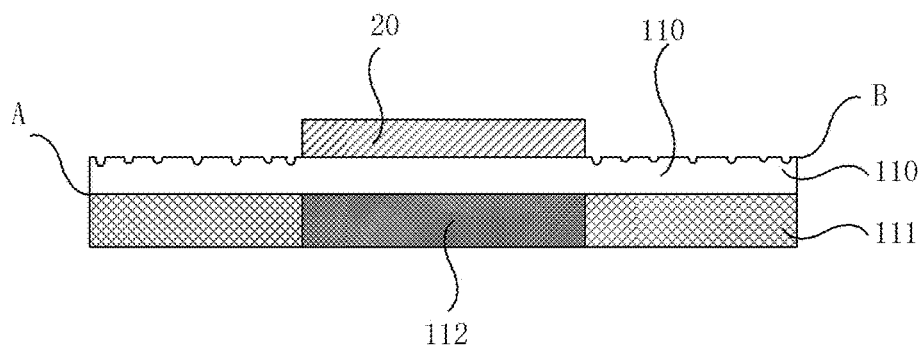

S104, as shown in FIG. 3C, performing a texturing process for a portion of the second surface B of the base substrate 110 corresponding to the position of the black matrix 111, such that the portion of the second surface B not covered by the photoresist is coarse.

The method for manufacturing a display panel comprises: firstly, forming a black matrix on a first surface of a base substrate, and defining a plurality of display units with the criss-cross black matrix; then forming a photoresist on a second surface of the base substrate, wherein the first surface is arranged opposite to the second surface; since the display area of the display panel corresponds to the position of the display units, then performing a curing process for the photoresist corresponding to the position of the display units, such that the portion of the base substrate corresponding to the position of the display units can be protected; then removing the photoresist corresponding to the position of the black matrix, such that the portion of the second surface of the base substrate corresponding to the position of the black matrix is not covered by the photoresist; then, performing a texturing process for a portion of the second surface of the base substrate corresponding to the position of the black matrix, such that this portion is coarse. In such a manner, when visible light is incident to the non display area of the display panel corresponding to the black matrix, diffuse reflection will occur for all visible light incident to the non display area due to the coarse surface, which can eliminate the reflected light in the non display area. Although etching process is not performed for the portion of the base substrate corresponding to the position of the display area, the reflected light in the display area has little influence on the display effect, since the intensity of the light emitted from the display area (for display) is far greater than the intensity of the reflected light. Therefore, on the premise of ensuring the normal display of the display panel, the embodiment provided by the present invention eliminates the reflected light of all the visible light incident to the non display area, without increasing the thickness of the display panel, thereby improving the image quality and product quality.

It should be noted that, firstly, the display substrate can be a color film substrate 10' provided with a black matrix 111 and a color film, the display substrate can also be an array substrate 10 provided with a black matrix 111 and a color film. The display substrate is not limited herein.

Figure 1A:
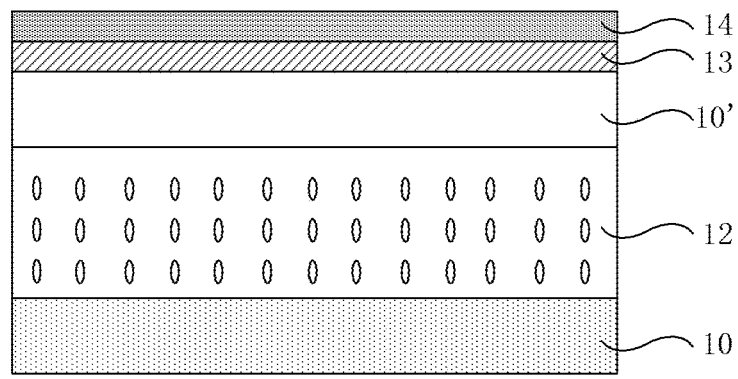
FIG. 1A is a structural schematic diagram of a display panel in the prior art.
Figure 1B:
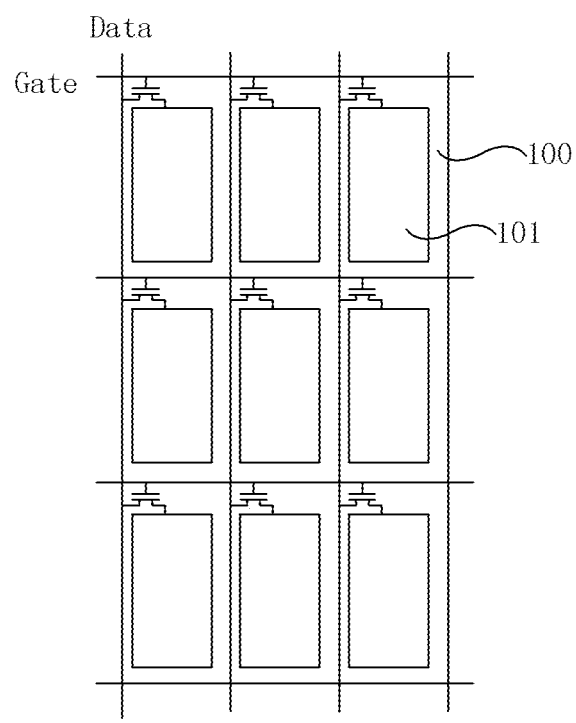
FIG. 1B is a schematic diagram of overlooking structure of an array substrate in the prior art.

Secondly, a plurality of sub pixels 100 are defined by a plurality of criss-cross gate lines Gate and date data lines Data in the array substrate 10 (of which a top view is shown in FIG. 1B) A pixel electrode 101 is provided in each sub-pixel 100.

Figure 1C:
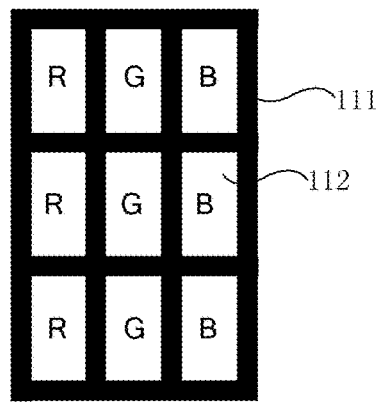
FIG. 1C is a schematic diagram of overlooking structure of a display substrate in the prior art.

The display substrate, such as the color film substrate (of which a top view is shown in FIG. 1C), comprises the black matrix 111 and a plurality of display units 112 defined with the criss-cross black matrix 111; a color film is provided in the display unit 112, of which the color can be red (R), green (G) or blue (B).

Wherein the display units 112 are one-to-one correspond to the pixel electrodes 101 in sub-pixel 100 of the array substrate shown in FIG. 1B. A plurality of pixel units are formed after box aligning is performed for the display substrate and the array substrate, each pixel unit comprising sub-pixels 100 of three different colors: red (R), green (G), and blue (B).

In addition, the non display area in the sub-pixel 100 other than the pixel electrode 101 corresponds to the position of the black matrix 111 on the display substrate, such that the black matrix 111 can shield the control circuit (such as a TFT area), preventing light exposure to the control circuit, and avoiding damage to the circuit.

Thirdly, the base substrate 110 can be made of glass or quartz.

Fourthly, the texturing process refers to performing a roughening process to the surface of the base substrate 110 corresponding to the non display area, such that the surface is coarse, resulting in inconsistent directions for the visible light incident to the non display area after being reflected (i.e., inducing diffuse reflection), thereby eliminating the influence of the reflected light effect on the display effect. The texturing process can use sand blasting, polishing process, or solution etching process. Since solution etching process is simple for operation, the damage to the display panel being small, it is preferable for the present invention. The following embodiments are described with using etching solution 22 for the texturing process.

Figure 5A:
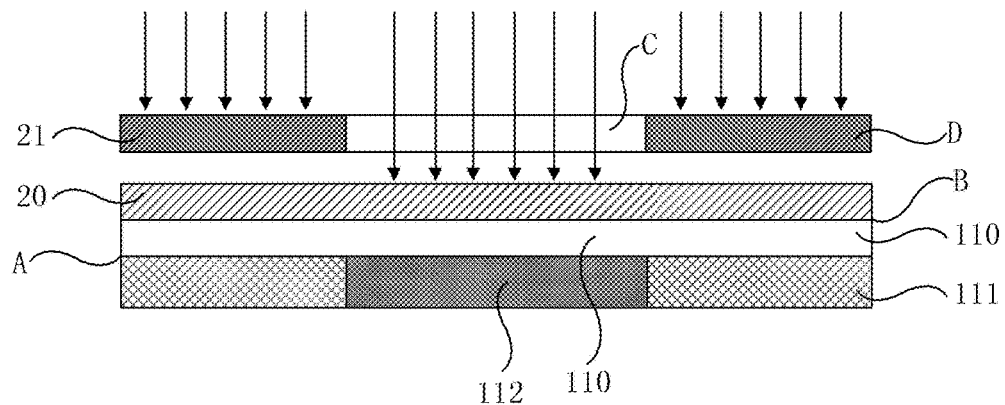
FIG. 5A-FIG. 5B are schematic diagrams of every stages in another method of manufacturing a display panel provided by an embodiment of the present invention.
Figure 5B:
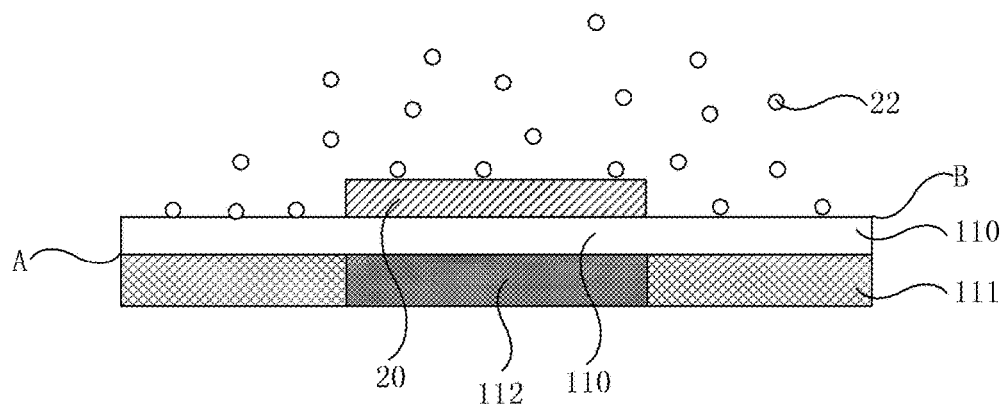

In particular, as shown in FIG. 5A-FIG. 5B, the solution etching process can be, with a high pressure gas, spraying an etching solution 22 on the second surface B of the base substrate 110, etching a portion of the second surface B not covered by the photoresist 20 (i.e., the portion of the second surface B corresponding to the position of the black matrix).

Optionally, the etching solution can be added with bubbles, such that the etching solution 22 sprayed on the second surface B of the base substrate 110 has an inhomogeneous distribution, forming a coarse surface. In this way, it is avoided that a smooth etched surface is formed due to a homogeneous coverage of the etching solution 22 on the second surface B, which reduces the effect of diffuse reflection. In particular, the bubbles can be formed by adding dry air, hydrogen or nitrogen into the etching solution 22

Fifthly, after the texturing process, the display substrate can be washed to avoid the erosion of the base substrate 110 due to the residual etching solution 22.

Sixthly, the curing process can be achieved with high temperature, high pressure curing process, exposure or development process. For exposure or development process, when a photoresist curable in an exposure condition (positive photoresist) is used, the above mentioned curing process can be an exposure process. Therefore, if the photoresist 20 formed on the second surface B of the base substrate 110 is a positive photoresist, an exposure process can be performed to the photoresist 20 corresponding to the position of the display units 112, such that the photoresist 20 at this position is cured. A development process can be performed to the photoresist 20 corresponding to the position of the black matrix 111, such that the photoresist 20 not cured at this position can be removed.

In addition, when a photoresist curable in a development condition (negative photoresist) is used, the above mentioned curing process can be a development process. Therefore, if the photoresist 20 formed on the second surface B of the base substrate 110 is a negative photoresist, a development process can be performed to the photoresist 20 corresponding to the position of the display units 112, such that the photoresist 20 at this position is cured. An exposure process can be performed to the photoresist 20 corresponding to the position of the black matrix 111, such that the photoresist 20 not cured at this position can be removed.

The curing process is not limited herein, though the following embodiments are described with using a positive photoresist as the photoresist 20.

In the following, the method for manufacturing the display substrate is described in detail.

Embodiment 1

S201, after the above mentioned step S101, as shown in FIG. 4 and FIG. 5A, providing a mask plate 21 on the surface of the photoresist 20, a transparent area C of the mask plate 21 being corresponding to the position of the display units 112, and an opaque area D of the mask plate 21 being corresponding to the position of the black matrix 111.

S202, exposing the photoresist 20 such that the photoresist 20 corresponding to the transparent area C of the mask plate 21 is cured, therefore the portion of the surface of the base substrate 110 corresponding to the display area is protected from being roughened by the texturing process.

S203, if the base substrate 110 is a glass substrate, dry air can be filled into the hydrofluoric acid solution to form an etching solution with bubbles. Moreover, as shown in FIG. 5B, the etching solution 22 can be sprayed on the second surface B of the base substrate 110 with a high pressure gas, forming a course surface as shown in FIG. 3D.

S204, as shown in FIG. 3D, peeling off the photoresist 20 corresponding to the position of the display units 112.

It should be noted that if the photoresist 20 is white and transparent, it will not affect the display, so the step S204 can also be omitted. If the photoresist 20 is not white or transparent, or in order to reduce the thickness of the display device, the step S204 can be carried out, peeling off the photoresist 20.

Embodiment 2

Figure 6:
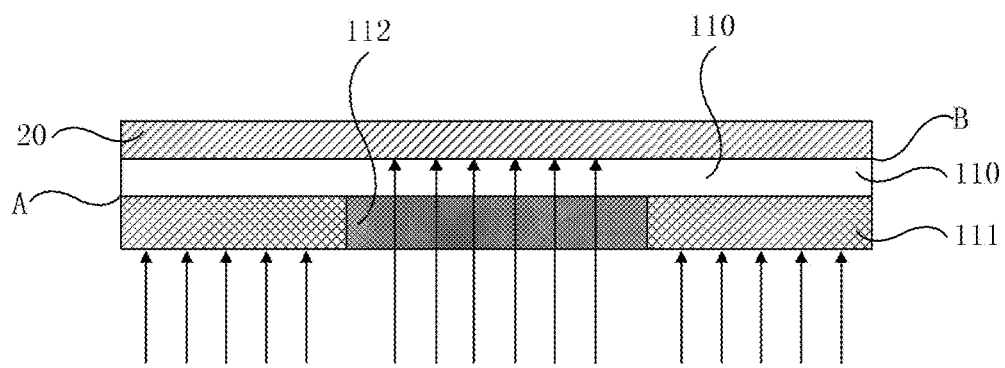
FIG. 6 is a schematic diagram of a method for manufacturing a display panel provided by an embodiment of the present invention.

After the above mentioned step S101, as shown in FIG. 6, employing the black matrix 111 as a mask plate; exposing the photoresist 20 from a side of the first surface A of the base substrate 110, such that the photoresist 20 corresponding to the position of the display units 112 is cured, therefore the portion of the surface of the base substrate 110 corresponding to the display area is protected from being roughened by the texturing process.

Then, the step S203 and S204, or the step S104 can be carried out.

Compared with the embodiment 1, the embodiment 2 uses the opaque characteristic of the black matrix 111, exposuring in a different direction, omitting the step of providing the mask plate 21.

An embodiment of the present invention provides a display substrate, as shown in FIG. 3D, wherein the display substrate comprises a base substrate 110, a black matrix 111 on a first surface A of the base substrate 110, and a plurality of display units 112 defined with the criss-cross black matrix 111. A portion of a second surface B of the base substrate 110 corresponding to the position of the black matrix 111 is coarse; wherein the first surface A is arranged opposite to the second surface B. In such a manner, when visible light is incident to the non display area of the display panel corresponding to the black matrix, diffuse reflection will occur for all visible light incident to the non display area due to the coarse surface, which can eliminate the reflected light in the non display area. Although etching process is not performed for the portion of the base substrate corresponding to the position of the display area, the reflected light in the display area has little influence on the display effect, since the intensity of the light emitted from the display area (for display) is far greater than the intensity of the reflected light. Therefore, on the premise of ensuring the normal display of the display panel, the embodiment provided by the present invention eliminates the reflected light of all the visible light incident to the non display area, without increasing the thickness of the display panel, thereby improving the image quality and product quality.

An embodiment of the present invention provides a display device, wherein the display device comprises the display substrate 11 mentioned above. The display substrate has the same advantages as the display substrate 11 provided by the above mentioned embodiments. Since the structures and the beneficial effects have been described in detail in the aforementioned embodiments, they will not be repeated here.

It should be noted that in the embodiments of the present invention, the display device can comprise liquid crystal display device; for example, the display device can be any product or component with display function, such as liquid crystal display, liquid crystal TV, digital photo frame, mobile phone, tablet computer and so on.

Figure 7:
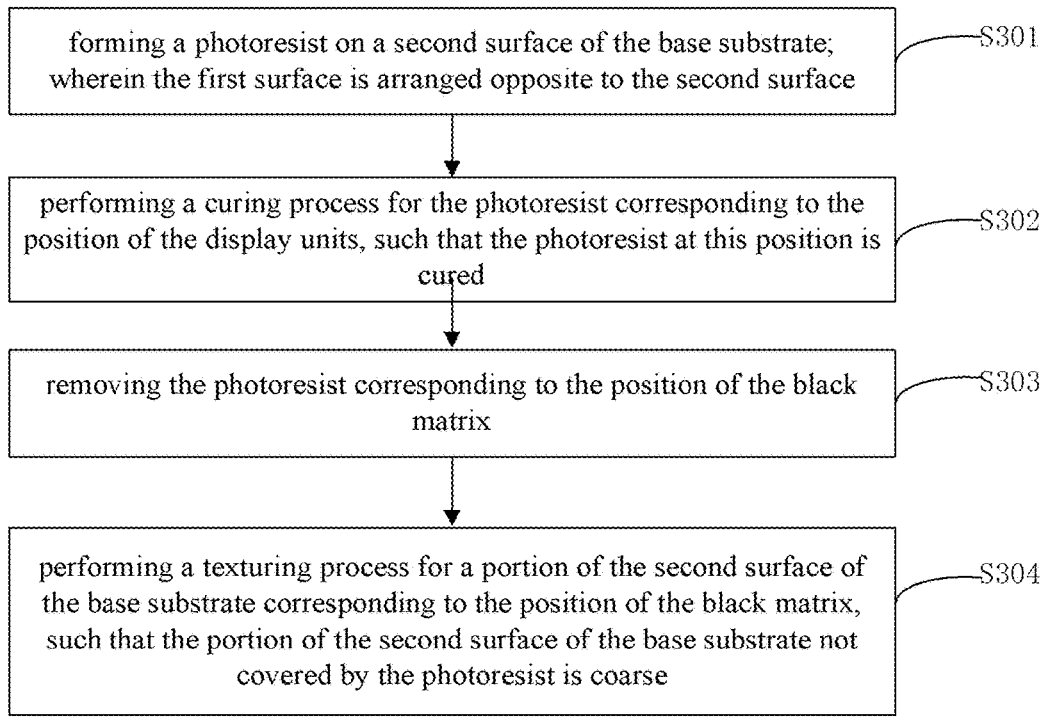
FIG. 7 is a flow chart of a method for manufacturing a display panel provided by an embodiment of the present invention.
Figure 8A:
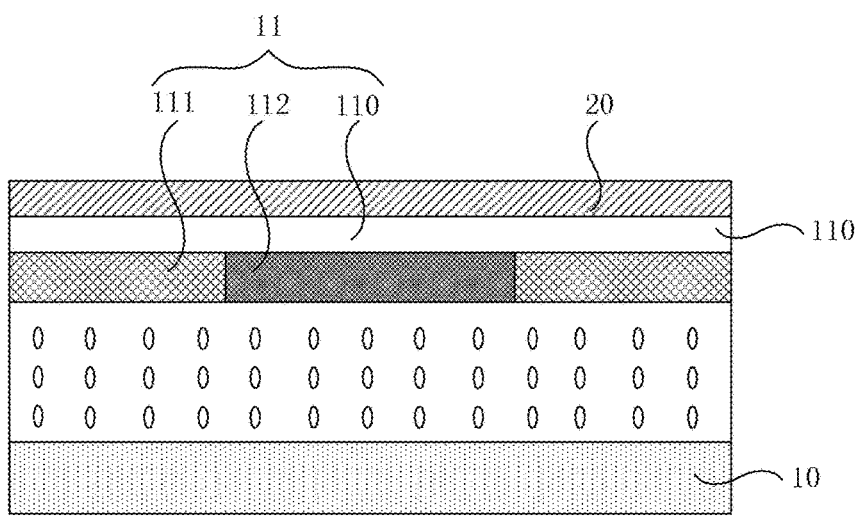

An embodiment of the present invention provides a method for manufacturing a display device, the method comprises forming a display panel 11; the display panel 11 comprises a base substrate 110, a black matrix 111 on a first surface A of the base substrate 110, and a plurality of display units 112 defined with the criss-cross black matrix 111, as shown in FIG. 7, the method can further comprise (wherein the following embodiment is described with the display substrate 10 being a color film substrate 10'):

S301, as show in FIG. 8A, forming a photoresist 20 on a second surface B of the base substrate 110; wherein the first surface A is arranged opposite to the second surface B.

Figure 8B:
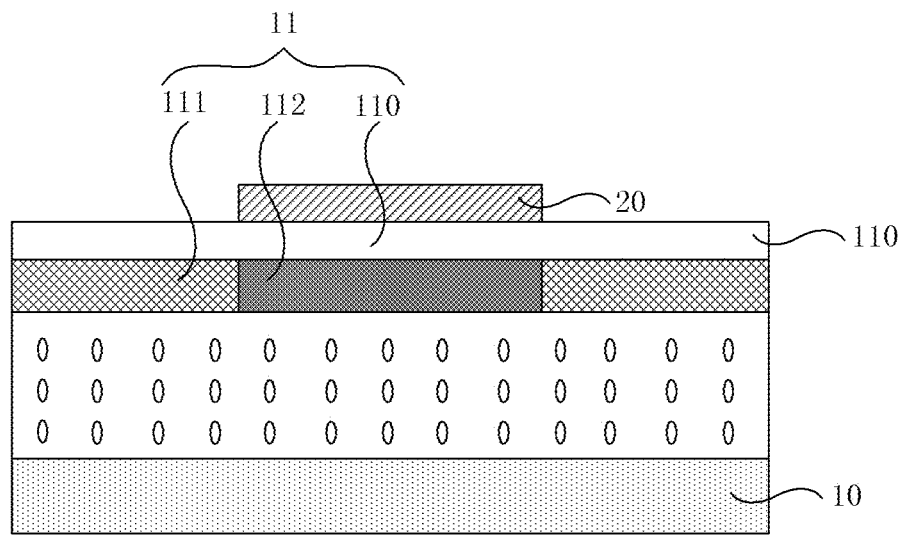

S302, as show in FIG. 8B, performing a curing process for the photoresist 20 corresponding to the position of the display units 112, such that the photoresist 20 at this position is cured.

S303, removing the photoresist 20 corresponding to the position of the black matrix 111.

Figure 8C:
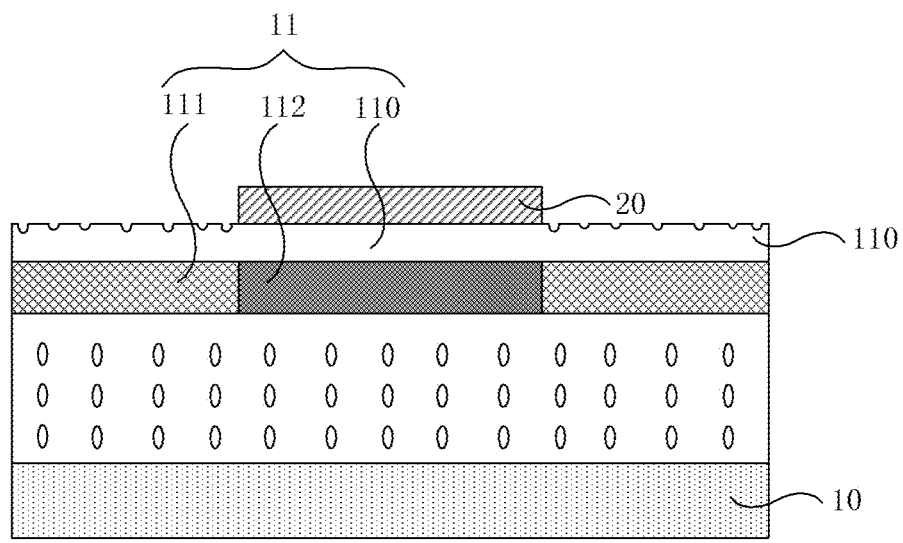

S304, as show in FIG. 8C; performing a texturing process for a portion of the second surface B of the base substrate 110 corresponding to the position of the black matrix 111, such that the portion of the second surface B of the base substrate 110 not covered by the photoresist is coarse.

The method for manufacturing a display device comprises: firstly, forming a display substrate; the display substrate comprising a base substrate, a black matrix on a first surface of the base substrate, and a plurality of display units defined with the criss-cross black matrix; then forming a photoresist on a second surface of the base substrate, wherein the first surface is arranged opposite to the second surface; since the display area of the display panel corresponds to the position of the display units, then performing a curing process for the photoresist corresponding to the position of the display units, such that the portion of the base substrate corresponding to the position of the display units can be protected; then removing the photoresist corresponding to the position of the black matrix, such that the portion of the second surface of the base substrate corresponding to the position of the black matrix is not covered by the photoresist; then, performing a texturing process for a portion of the second surface of the base substrate corresponding to the position of the black matrix, such that this portion is coarse. In such a manner, when visible light is incident to the non display area of the display panel corresponding to the black matrix, diffuse reflection will occur for all visible light incident to the non display area due to the coarse surface, which can eliminate the reflected light in the non display area. Although etching process is not performed for the portion of the base substrate corresponding to the position of the display area, the reflected light in the display area has little influence on the display effect, since the intensity of the light emitted from the display area (for display) is far greater than the intensity of the reflected light. Therefore, on the premise of ensuring the normal display of the display panel, the embodiment provided by the present invention eliminates the reflected light of all the visible light incident to the non display area, without increasing the thickness of the display panel, thereby improving the image quality and product quality.

In the following, the method for manufacturing the display device is described in detail.

Embodiment 3

Figure 10:
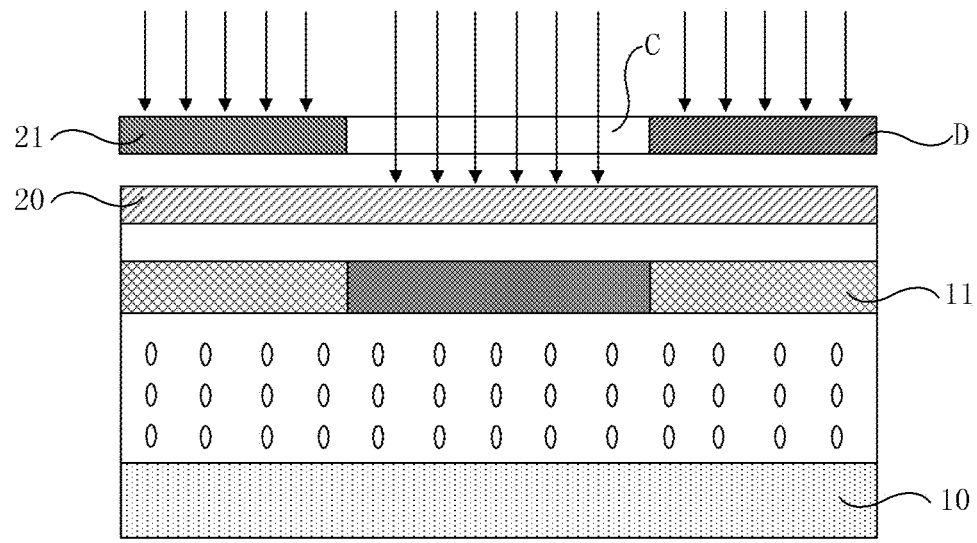
FIG. 10 is a schematic diagram of a method for manufacturing a display device provided by an embodiment of the present invention.

S401, after the above mentioned step S301, as shown in FIG. 9 and FIG. 10, providing a mask plate 21 on the surface of the photoresist 20, a transparent area C of the mask plate 21 being corresponding to the position of the display units 112, and an opaque area D of the mask plate 21 being corresponding to the position of the black matrix 111.

S402, exposing the photoresist 20 such that the photoresist 20 corresponding to the transparent area C of the mask plate 21 is cured, therefore the portion of the surface of the base substrate 110 corresponding to the display area is protected from being roughened by the texturing process.

S403, if the base substrate 110 is a glass substrate, dry air can be filled into the hydrofluoric acid solution to form an etching solution with bubbles. Moreover, as shown in FIG. 5B, the etching solution 22 can be sprayed on a surface of the base substrate 110 departing from the array substrate 10 (i.e., the second surface B) with a high pressure gas, forming a coarse surface as shown in FIG. 8D.

S404, as shown in FIG. 8D, peeling off the photoresist 20 corresponding to the position of the display units 112.

Embodiment 4

Figure 11:
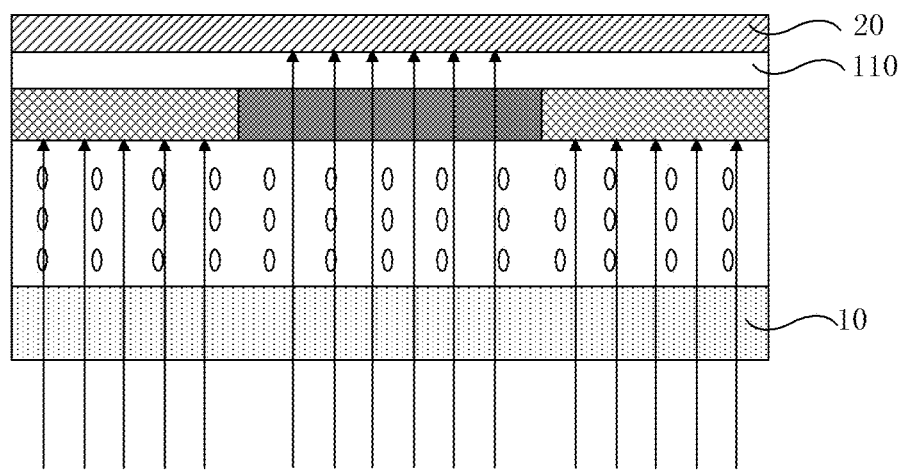
FIG. 11 is a schematic diagram of another method for manufacturing a display device provided by an embodiment of the present invention.

After the above mentioned step S301, as shown in FIG. 11, employing the black matrix 111 as a mask plate; exposing the photoresist 20 from a side of the first surface A of the base substrate 110, such that the photoresist 20 corresponding to the position of the display units 112 is cured, therefore the portion of the surface of the base substrate 110 corresponding to the display area is protected from being roughened by the texturing process.

Then, the step S403 and S404, or the step S304 can be carried out.

Compared with the embodiment 3, the embodiment 4 uses the opaque characteristic of the black matrix 111, exposuring in a different direction, omitting the step of providing the mask plate 21. Moreover, the embodiment 4 can be performed after box aligning is performed for the array substrate 10 and the color film substrate 10'. In such a manner, bad vacuum adsorption can be avoided when the color film substrate 10' is grasped by a manipulator with vacuum adsorption method during box aligning, which may occur due to the coarse surface of a portion on the side of the color film substrate 10' departing from the array substrate 10 (i.e., the position corresponding to the position of the black matrix The above embodiments are only used for explanations rather than limitations to the present invention, the ordinary skilled person in the related technical field, in the case of not departing from the spirit and scope of the present invention, may also make various modifications and variations, therefore, all the equivalent solutions also belong to the scope of the present invention, the patent protection scope of the present invention should be defined by the claims.

The invention claimed is:

1. A method for manufacturing a display panel comprising:
    forming a black matrix on a first surface of a base substrate that defines a plurality of display units;
    forming a photoresist on a second surface of the base substrate, the first surface being arranged opposite to the second surface;
    performing a curing process for the photoresist corresponding to the position of the display units;
    removing the photoresist corresponding to the position of the black matrix; and
    performing a texturing process for a portion of the second surface of the base substrate corresponding to the position of the black matrix.

2. The method according to claim 1, wherein performing a curing process for the photoresist corresponding to the position of the display units comprises:
    providing a mask plate on the surface of the photoresist, a transparent area of the mask plate corresponding to the position of the display units, and an opaque area of the mask plate corresponding to the position of the black matrix; and
    exposing the photoresist such that the photoresist corresponding to the transparent area of the mask plate is cured.

3. The method according to claim 1, wherein performing a curing process for the photoresist corresponding to the position of the display units comprises:

employing the black matrix as a mask plate; and exposing the photoresist from a side of the first surface of the base substrate, such that the photoresist corresponding to the position of the display units is cured.

4. The method according to claim 1, wherein performing a texturing process for a portion of the second surface of the base substrate corresponding to the position of the black matrix comprises:

removing the photoresist corresponding to the position of the black matrix; and spraying an etching solution on the second surface of the base substrate, thereby etching the area of the second surface that is not covered by the photoresist.

5. The method according to claim 4, wherein the etching solution comprises bubbles.

6. The method according to claim 4, wherein the etching solution comprises hydrofluoric acid solution and the base substrate is a glass substrate.

7. The method according to claim 5, wherein the etching solution comprises hydrofluoric acid solution and the base substrate is a glass substrate.

8. The method according to claim 1, comprising peeling off the photoresist corresponding to the position of the display units after the step of performing a texturing process has been performed.

9. A method for manufacturing a display device comprising:

forming a display panel comprising:
 a base substrate;
 a black matrix on a first surface of the base substrate; and
 a plurality of display units defined by the black matrix;

forming a photoresist on a second surface of the base substrate, the first surface being arranged opposite to the second surface;

performing a curing process for the photoresist corresponding to the position of the display units;

removing the photoresist corresponding to the position of the black matrix; and performing a texturing process for a portion of the second surface of the base substrate corresponding to the position of the black matrix.

10. The method according to claim 9, wherein performing a curing process for the photoresist corresponding to the position of the display units comprises:

providing a mask plate on the surface of the photoresist, a transparent area of the mask plate corresponding to the position of the display units, and an opaque area of the mask plate corresponding to the position of the black matrix;

exposing the photoresist such that the photoresist corresponding to the transparent area of the mask plate is cured.

11. The method according to claim 9, wherein performing a curing process for the photoresist corresponding to the position of the display units comprises:

employing the black matrix as a mask plate; and exposing the photoresist from a side of the first surface of the base substrate, such that the photoresist corresponding to the position of the display units is cured.

12. The method according to claim 9, wherein performing a texturing process for a portion of the second surface of the base substrate corresponding to the position of the black matrix comprises:

removing the photoresist corresponding to the position of the black matrix; and spraying an etching solution on the second surface of the base substrate, thereby etching the area of the second surface that is not covered by the photoresist.

13. The method according to claim 9, comprising peeling off the photoresist corresponding to the position of the display units after the step of performing a texturing process has been performed.

* * * * *